United States Patent Office
3,349,081
Patented Oct. 24, 1967

3,349,081
PROCESS FOR PREPARING SUCROSE ESTERS OF HIGH MOLECULAR WEIGHT FATTY ACIDS
Luciano Nobile, Milan, Italy, assignor to Ledoga S.p.A., Milan, Italy
No Drawing. Filed June 15, 1964, Ser. No. 375,293
Claims priority, application Great Britain, June 26, 1963, 25,434/63
1 Claim. (Cl. 260—234)

The present invention relates to a purification process for obtaining sucrose monoesters of aliphatic acids from natural fats, oils and waxes, which are soluble or dispersible in water with formation of clear or almost clear solutions and dispersions.

The known transesterification processes for the manufacture of sucrose esters may be classified into two groups; namely, those which give a good yield but do not start from natural raw materials, but rather from expensive synthetic materials, and those which start from natural raw materials of low cost but give insufficient yield to compensate for the necessary expense of separation and purification of the desired product.

More particularly, the processes affording a good yield of sucrose esters are those which start with synthetic esters of fatty acids with the volatile lower monovalent aliphatic alcohols, such as the methyl and ethyl esters, and are therefore expensive. The processes starting, on the contrary, from natural esters of aliphatic acids with glycerol, that is to say, natural fats, oils of low cost (hereinafter referred to collectively as fats or fatty materials, regardless of whether the acid moieties are saturated or unsaturated) do not give a yield of lyophilic fraction (water-soluble) which is sufficient to compensate for the expense of its separation from the non-soluble fraction.

It is known that in the transesterification of glyceridic fats and oils with sucrose, it is relatively easy to effect splitting off of one acid group from the glycerol triester, but that the splitting off of two such groups is much more difficult; while, under practical operating conditions, the alcoholysis of the third ester group by the sucrose scarcely takes place at all.

It is also known that the formation of sucrose diesters cannot be avoided on transesterification with fatty triglycerides (glycerol triesters) even if an excess of 50% or more over the equimolecular proportions is employed. This introduces the problem of economically separating sucrose monoesters from the diesters and glycerol esters, the separation being complicated by the presence of uncombined excess sucrose.

We have found that to obtain an efficient separation of sucrose monoesters from sucrose diesters in a transesterification reaction product resulting from the heating of sucrose with fatty and waxy glycerol triesters, i.e., of saturated and unsaturated aliphatic acids of 6 to 30 carbon atoms, the reaction mass derived from transesterification, after elimination of the reaction solvent and solution in a mixture of aqueous sodium chloride and butanol and evaporation to dryness of the organic phase according to known procedures, is dissolved in a solvent of the class consisting of dichloroethane, methyl ethyl ketone and ethyl acetate at a temperature between about 50° C. and the boiling temperature of the solvent, and the solution is then cooled, thus effecting precipitation of sucrose monoesters in a comparatively pure condition.

The residual mother liquors contain water-insoluble sucro-glycerides (sucrose diesters and gycerol mono-, di-, and triesters), which can be used for subsequent transesterification procedures.

The following non-limitative examples illustrate the invention.

Example 1

An amount of 85.2 grams (0.1 mole) of anhydrous lard (saponification number 197) is reacted with 216 grams (0.63 mole) of anhydrous sucrose by dissolving them in 1382 grams of anhydrous dimethylformamide (DMF) (6.4 grams to 1 gram of sucrose) and heating the solution for 15 hours at 95° C. in the presence of 20.2 grams anhydrous $K_2CO_3$ under agitation. At the end the DMF is completely distilled under vacuum on the water bath. The residue contains 44.1% of free sugar, whilst the rest of the sugar is combined with the fatty acid. The residue is dissolved cold with stirring in 640 grams of 10% NaCl solution (double the weight in comparison with the residue) and 270 ml. butanol. The butanol layer is separated and washed twice in a separator funnel with 200 ml. of water each time. The butanol extracts are stirred for 15 minutes and filtered in vacuo after percolating at the pump. The filtrate is evaporated to dryness. 134 grams (157.2% on weight of fatty material) of a pale yellow product of waxy consistency, containing 37.13% of bound sucrose and 0.33% of free sucrose, are obtained. It is heat-soluble in dichloroethane, methyl ethyl ketone and ethyl acetate from whose solutions it is partially separated by cooling. By this means, that is to say, by dissolving with the aid of heat in a volume of these solvents equal to about 5 times the weight of the products, followed by cooling, one obtains precipitation of comparatively pure water-soluble monoester of sucrose containing 46.27% of combined sucrose and 0.82% of free sucrose. From the mother liquor evaporated to dryness 38.9 grams (45.7% on the weight of fatty material) of water insoluble derivatives (sucrose diester and glycerol mono-, di-, and triester) containing 19.31% of combined sucrose and no content of free sugar are obtained.

Example 2

An amount of 175.7 grams (0.26 mole) of anhydrous cocoanut oil (saponification number 250) is heated with 563 grams (1.64 mole) of anhydrous sucrose dissolved in 3500 grams of anhydrous DMF in the presence of 4.16 grams of anhydrous $K_2CO_3$ for 15 hours at 95° C. under agitation. Then the DMF is completely distilled under vacuum. The residue contains 54.3% of free sugar, while the rest of the sugar is combined with fatty acid. The residue is dissolved in 770 grams of aqueous 5% NaCl solution and 400 ml. of butanol. The butanol layer is separated, washed with water and concentrated to dryness. 305.7 g. (174% on the weight of fatty material) of a pale yellow product of waxy consistency containing 38.86% of combined sucrose and 1% of free sucrose are obtained. The product is heat-dissolved in 1500 ml. of dichloroethane and the solution is cooled with ice. The precipitated product is collected and dried. 217.86 grams (124% based on the weight of fatty material) of quite water-soluble sucrose monoester containing 48.11% of combined sucrose are obtained. The mother liquor, evaporated to dryness, gives 87.85 g. (50% on starting fatty material weight) of a thick product containing 15.46% of combined sucrose (no free sucrose).

Example 3

An amount of 188.4 grams (0.285 mole) of anhydrous palmist oil (saponification number 254) is reacted with 616.8 grams (1.79 mole) of anhydrous sucrose after being dissolved in 3400 grams of DMF in the presence of 4.46 grams of anhydrous $K_2CO_3$, the reaction proceeding for 15 hours at 95° C. under agitation. The DMF is distilled under vacuum. The residue contains 55.07% of free sucrose. This residue is dissolved cold with stirring in 780 grams of 5% NaCl solution and 400 ml. of butanol. The butanol layer is separated, washed with water and concentrated to dryness under vacuum. 350.4 grams (186% based on the fatty material weight) of a pale yellow product of waxy consistency, containing 38.5% of combined sucrose and 1% of free sucrose, are obtained. The product is heat-dissolved in 1750 ml. of ethyl acetate and the solution is cooled in ice. The separated product is collected and dried. 238.3 grams (126.5% based on starting fatty material weight) of water-soluble sucrose monoester containing 48% of combined sucrose and 0.51% of free sucrose are obtained. The dried mother liquor yields 112.09 grams (59.9% based on starting fatty material weight) of a thick product containing 28.5% of combined sucrose and no free sucrose.

*Example 4*

An amount of 212.1 grams (0.24 mole) neat's-foot oil (saponification number 190) is heated with 518.6 grams (1.51 mole) of anhydrous sucrose dissolved in 3300 grams of anhydrous DMF in the presence of 5 grams of anhydrous $K_2CO_3$ for 15 hours at 95° C. under agitation. Then the DMF is distilled. The residue contains 42.64% of free sucrose, the rest of the sugar being combined with fatty acid. This residue is dissolved in 800 grams of sodium chloride solution (5%) and 400 ml. of butanol with agitation. The butanol layer is separated and dried under vacuum. 328 grams (155% based on the used fatty material weight) of a pale yellow product of waxy consistency, containing 38% of combined sucrose and 0.9% of free sucrose, are obtained. The product is heat-dissolved in 1600 ml. of methyl ethyl ketone and the solution is cooled in ice. The separated product is collected and dried. 222.7 grams (105% of starting fatty material weight) of water soluble sucrose monoesters, containing 47% of combined sucrose, are obtained. The dried mother liquor yields 106 grams (50% based on the fatty material weight) of a thick product containing 19.9% of combined sucrose.

Proceeding in the same way, it is possible to obtain soluble monoesters from neat's tallow and other fatty materials with properties which are very similar to those described in the above examples.

I claim:

In a process for preparing sucrose monoesters of high purity by transesterification of sucrose with natural triglycerides in dimethylformamide, followed by evaporation of the reaction solvent, treatment of the residue with a butanol-aqueous sodium chloride mixture and evaporation to dryness of the separated butanol layer, the step which comprises heating the residue from the evaporation of butanol with about 5 times its weight of a solvent of the class consisting of dichloroethane, methyl ethyl ketone and ethyl acetate at the boiling temperature of said solvent, cooling the solvent, and collecting the precipitate.

References Cited

UNITED STATES PATENTS 3,053,830 9/1962 Gaertner _____ 260—234
3,054,789 9/1962 D'Amato _____ 260—234

FOREIGN PATENTS 1,352,850 1/1964 France.

LEWIS GOTTS, *Primary Examiner.*

JOHNNIE R. BROWN, *Assistant Examiner.*